(12) United States Patent
Haaker et al.

(10) Patent No.: US 7,221,372 B2
(45) Date of Patent: May 22, 2007

(54) METHOD OF ANALYZING AND MODIFYING A FOOTPRINT

(75) Inventors: Thomas Haaker, Starnberg (DE); Roland Richter, Pöcking-Possenhofen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 238 days.

(21) Appl. No.: 11/080,776

(22) Filed: Mar. 14, 2005

(65) Prior Publication Data

US 2005/0156940 A1 Jul. 21, 2005

Related U.S. Application Data

(63) Continuation of application No. PCT/EP03/010016, filed on Sep. 9, 2003.

(30) Foreign Application Priority Data

Sep. 13, 2002 (DE) .............................. 102 42 639

(51) Int. Cl.
*G06T 15/00* (2006.01)
(52) U.S. Cl. .................. 345/582; 345/586; 345/587
(58) Field of Classification Search ............... 345/582, 345/586, 587; 382/118, 165, 154
See application file for complete search history.

(56) References Cited

U.S. PATENT DOCUMENTS

| | | | | |
|---|---|---|---|---|
| 5,877,771 | A | 3/1999 | Drebin et al. .............. | 345/586 |
| 6,097,397 | A | 8/2000 | Lee ............................ | 345/586 |
| 6,400,370 | B1 | 6/2002 | Lee et al. .................... | 345/586 |
| 6,766,281 | B1 * | 7/2004 | Vijayakumar et al. ...... | 702/190 |
| 6,850,243 | B1 * | 2/2005 | Kilgariff et al. ............ | 345/582 |
| 6,879,324 | B1 * | 4/2005 | Hoppe ......................... | 345/423 |
| 6,980,671 | B2 * | 12/2005 | Liu et al. ..................... | 382/118 |
| 7,061,500 | B1 * | 6/2006 | Baldwin ...................... | 345/582 |
| 7,158,658 | B2 * | 1/2007 | Liu et al. ..................... | 382/118 |
| 2002/0126133 | A1 | 9/2002 | Ewins ........................ | 345/587 |

OTHER PUBLICATIONS

Schilling, Andreas, et al.: "Texram: A Smart Memory for Texturing" IEEE Computer Graphics and Applications, May 1996, pp. 32-41.
Alvarez, A.: "Texture Resolution", The Gnomon Workshop Inc., 2000, 5 pages.
Akeley, K., et al.: "Real-Time Graphics Architecture", Fall 2001, pp. 1-24.

* cited by examiner

*Primary Examiner*—Phu K. Nguyen
(74) *Attorney, Agent, or Firm*—Laurence A. Greenberg; Werner H. Stemer; Ralph E. Locher

(57) ABSTRACT

In a method of analyzing and modifying a footprint depending on a specified number of texture elements touched by the footprint, in a graphics system providing the texture elements having a resolution, a dimension or a shape of the footprint is initially determined. On the basis of the specified number of texture elements and on the basis of the determined dimension or shape, the resolution of the texture elements associated with the footprint is specified. Then it is determined whether the graphics system provides texture elements having the specified resolution. If the graphics system provides texture elements having the specified resolution, the footprint is preserved. If the graphics system does not provide texture elements having the specified resolution, the texture elements which are provided by the graphics system and have a relevant resolution are selected, and those of the footprint are reduced such that the number of texture elements touched by the footprint having a reduced size is essentially equal to or smaller than the specified number.

7 Claims, 6 Drawing Sheets

METHOD OF ANALYZING AND MODIFYING A FOOTPRINT

CROSS-REFERENCE TO RELATED APPLICATION

This is a continuing application, under 35 U.S.C. § 120, of copending international application No. PCT/EP2003/010016, filed Sep. 9, 2003, which designated the United States; this application also claims the priority, under 35 U.S.C. § 119, of German patent application No. 102 42 639.2, filed Sep. 13, 2002; the prior applications are herewith incorporated by reference in their entirety.

BACKGROUND OF THE INVENTION

1. Field of the Invention

The present invention generally relates to a method for displaying images in a raster display controlled by a computer. In particular, the present invention relates to an anisotropic filter mechanism required for reconstructing, or scaling, discrete, stored images or for subjecting same to a perspective projection for the purposes of representation on raster display elements of a high quality. The above-mentioned discrete, stored images will be referred to as textures below. In particular, the present invention relates to a method for analyzing and modifying a footprint depending on a specified number of texture elements touched by the footprint in a graphics system providing the texture elements having a resolution.

2. Description of Prior Art

A "footprint" is a perspective projection of a picture element (pixel) of an object onto a curved surface. A "footprint" may be a convex quadrilateral representation reproducing the approximated result of the perspective projection onto a regular texel grid (texture-element grid) of a square picture element (pixel) of an object onto a curved surface.

In associating textures with picture elements (pixels) of an object, known graphics systems, e.g. OpenGL graphics systems, operate in such a manner that a footprint of a pixel of an object has one or more texture elements having a desired resolution associated with it, the footprint being approximated by a square. The disadvantage is that the approximation here is always effected by a square which is either too large or too small and that the shape of the footprint is not taken into account.

The resolution desired results in a texel size in a texel grid underlying the footprint. Various mipmap level exist for predetermined texel sizes. If a resolution is chosen which leads to a texel size for which there is no mipmap with a suitable resolution (level), the texture must be calculated at high expenditure.

SUMMARY OF THE INVENTION

Starting from this prior art, it is the object of the present invention to provide an improved method for modifying a footprint.

The present invention provides a method of modifying a footprint in dependence on a specified number of texture elements touched by the footprint, in a graphics system providing the texture elements having a resolution, including:
(a) determining a dimension or a shape of the footprint;
(b) specifying the resolution of the texture elements associated with the footprint, based on the specified number of texture elements and based on the dimension or shape determined in step (a); and
(c) determining whether the graphics system provides texture elements having the resolution specified in step (b),
 (c.1) if the graphics system provides texture elements having the resolution specified in step (b), maintaining the footprint; and
 (c.2) if the graphics system does not provide texture elements having the resolution specified in step (b), selecting the texture elements provided by the graphics system and having a respective resolution, and reducing the size of the footprint such that the number of texture elements touched by the footprint having the reduced size is essentially equal to or smaller than the specified number.

The present invention provides a method of modifying a footprint in dependence on a specified number of texture elements touched by the footprint, in a graphics system providing the texture elements having a resolution, comprising:
(a) determining a dimension or a shape of the footprint;
(b) specifying the resolution of the texture elements associated with the footprint, based on the specified number of texture elements and based on the dimension or shape determined in step (a); and
(c) determining whether the graphics system provides texture elements having the resolution specified in step (b),
 (c.1) if the graphics system provides texture elements having the resolution specified in step (b), maintaining the footprint; and
 (c.2) if the graphics system does not provide texture elements having the resolution specified in step (b), selecting the texture elements provided by the graphics system and having a respective resolution, and reducing the size of the footprint such that the number of texture elements touched by the footprint having the reduced size is essentially equal to or smaller than the specified number.

Unlike the prior art, in accordance with which a filtering which may also be referred to as isotropic filtering is performed, the present invention teaches distributing a number of available texture elements having a specified resolution and, therefore, having a specified size, to the footprint in an optimum manner rather than the "rough" approximation of the footprint by a square completely surrounding same or being completely contained in the footprint. Here, the footprint is overlapped by the texture elements, an analysis and modification of the footprint being performed in accordance with the invention, if required, to obtain the optimum distribution of the texture elements to the footprint.

In accordance with a preferred embodiment, the inventive method is used in a graphics system providing the texture elements having various resolutions, texture elements having a resolution which is one down from the specified resolution being selected in step (c.2). Preferably, the graphics system provides the texture elements having various resolutions in the form of mipmaps of various levels.

In accordance with a further preferred embodiment, for the purposes of determining the resolution, a rectangle surrounding the footprint is specified in step (b), vertices of the footprint being on edges of the rectangle. If it is found that for this rectangle, no texture elements having a relevant size, i.e. resolution, exist for achieving the desired number P, a clamping box, or clamping square, which is defined in dependence on the resolution made available by the graphics system and in dependence on the number of texture elements is specified in a preferred development of the above-described embodiment. Subsequently, the size of the footprint is reduced by shifting the vertices of the footprint to the edges of the clamping box.

Preferably, the above-described rectangle and the clamping box are specified based on a thickness, or expansion, parameter of the footprint, the thickness parameter reproducing a longitudinal deformation of the footprint.

In accordance with a further preferred embodiment, a determination as to whether an edge of the footprint exceeds a specified dimension is made in context with the determination of a dimension or a form of the footprint, and if this is so, the size of the footprint is reduced for such time until the dimension of the edge is smaller than or equal to the specified dimension.

Therefore, the inventive method provides a novel approach which may, in accordance with an embodiment, also be controlled by a user for analyzing and modifying a footprint.

In order to retrieve the discrete texture image, all square elements of the regular texel grid—the texels—overlapped by the area of the footprint, must be read in and processed by a processing unit. The inventive method allows both the number of texels touched by the footprint and the lengths of the edges of the footprint to be limited. In accordance with the invention, an additional control input signal, to be precise the performance parameter P, is provided for this purpose. This parameter P may be provided by a user. The limitation of the lengths of the edges of the footprint is determined by a further parameter $E_{max}$ defining a maximum edge length. This parameter $E_{max}$ may be hard-coded, for example.

The advantage of the present invention is that by setting the control input signal P, a compromise between the retrieved/reconstructed image quality (large number of texels used), on the one hand, and the processing speed (small number of texels used), on the other hand, may be achieved. A benefit of limiting the boundary edges is that the hardware expense required for further processing of the footprint in subsequent processes may be significantly reduced. Such subsequent processes include, for example, determining the texels overlapped by the footprint and/or weighting these specific texels. By clamping the edge lengths, the hardware expense associated with these process steps may be clearly reduced.

In general, the data produced by the inventive method may be provided to every texel-oriented raster process.

In accordance with a preferred embodiment of the present invention, a plurality of so-called image maps having various resolutions, which image maps are also referred to as mipmaps, are provided for a texture associated with the footprint, as has already been described above. In order to specify the resolution, the size of the texels in a texel grid which are touched by the footprint is determined in dependence on the dimension or shape of the footprint and in dependence on a desired image quality of the footprint to be represented. Depending on the texel size thus determined it is established whether there exists, among the plurality of image maps, an image map whose associated texel size matches the texel size established. If this is so, the respective image map is employed for representing the footprint. If there is no such respective image map, however, the size of the footprint is reduced as has been described above, so that, depending on the image quality of the footprint, an available image map having a resolution which is one down from the desired resolution and having a respective texel size is selected for representing the footprint.

Preferably, the image quality is specified by the performance parameter C essentially indicating the number of texels in a texel grid which are touched by the footprint.

In accordance with the above-described preferred embodiment, a description will be given of essentially two approaches and/or techniques for restricting the number of texels used for representing a footprint (depending on the setting of the performance parameter P). If pre-filtered versions of a texture image having a low resolution—the so-called mipmaps—are available, a suitable mipmap level will be calculated on the basis of the thickness information. Hereby, the size of a square texel in the texel grid is then determined in an implicit manner. This calculation of the level is based on the actual spatial dimensions and/or the shape of the footprint. If no pre-filtered image map (mipmap) having the level required is available, the area of the footprint is reduced by shrinking the boundaries (edges) of the footprint in a selective manner. This shrinking of the edges and/or reducing of the area is performed on the basis of the shape, the performance parameter P and a texel size of the next available image map (mipmap) in the least favorable case, the next available image map is the original base map itself.

In accordance with a further preferred embodiment of the present invention, the incoming quadrilateral footprint defined by its four vertices is initially analyzed with regard to its area and/or its shape and/or the spatial expansions of its edges. This analysis includes the following steps:

determining a direction of rotation of the footprint which may either be clockwise or counterclockwise;

calculating an anisotropic thickness parameter describing the extent of the longitudinal deformation of the footprint;

determining a bounding box for the footprint;

creating a clamping box clamping a linearly shrunk version of the original footprint in such a manner that a horizontal width and a vertical height of any edge (of the shrunken footprint) does not exceed a predefined limit. This predefined limit is specified based on the above-described maximum length value for the edges $E_{max}$. In addition, the dimension of the clamping box depends on the thickness parameter and is set such that the number of texels overlapped by the clamping box does not exceed a boundary specified by the performance parameter P.

Once the incoming footprint has been analyzed in the above-described manner, the information thus obtained and analyzed is subsequently assessed so as to produce output data representing a possibly modified footprint along with the associated mipmap level and an associated magnification level. This mainly involves the conversion of the original coordinates of all vertices of the original footprint to the coordinate system specified by the mipmap level calculated. A projection of the vertices of the footprint onto the clamping box will effect additional shrinking of the footprint, if necessary.

Thus, an advantage of the present invention is that incoming footprint coordinates are modified such that an edge width or edge height preferably does not exceed a hard-coded maximum length $E_{max}$, the number of texels overlapped by the footprint equals or is smaller than the number to which the number of these texels has been predefined by a user, the shape of the footprint is preserved if a scaling-down is selected by a mipmap level greater than 0, and spatial and temporal discontinuities of the image retrieved are avoided.

In accordance with a preferred embodiment of the present invention, the inventive method is implemented in hardware in the shape of a hardware pipeline, which enables accelerated processing of a plurality of footprints.

BRIEF DESCRIPTION OF THE DRAWINGS

Preferred embodiments of the present invention will be explained below in more detail with reference to the accompanying figures, wherein.

DESCRIPTION OF PREFERRED EMBODIMENTS

Figure 1A:
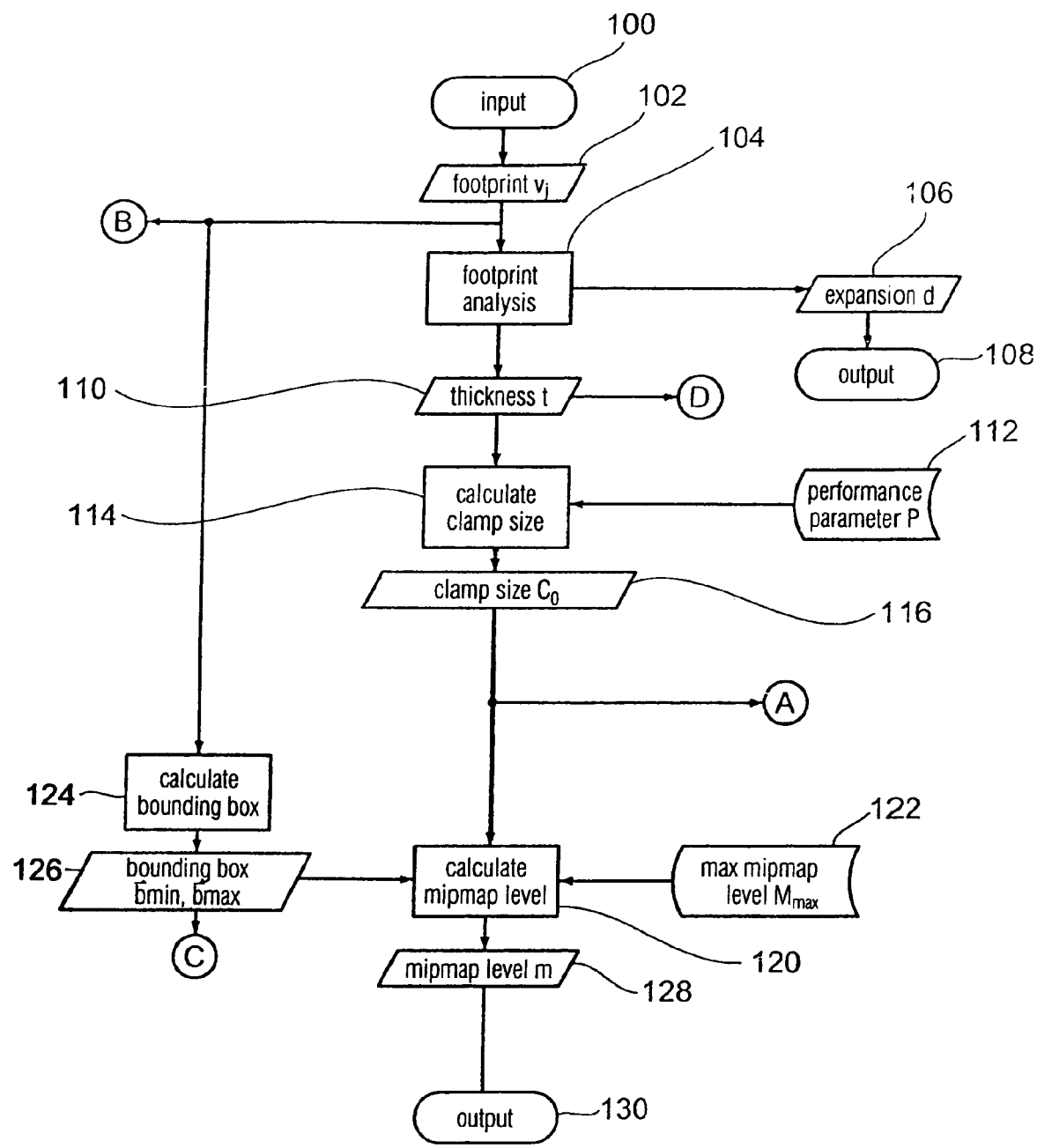
FIGS. 1A and B show a flow chart depicting an overview of the method in accordance with a preferred embodiment of the present invention.

With reference to FIG. 1, an overview of the inventive method in accordance with a preferred embodiment will be described below, the individual process steps shown in FIG. 1 being explained in more detail below with reference to the remaining figures.

The inventive method starts at block 100, where the data describing the footprint is received. In the following description, use is always made of the term "footprint", which is a convex quadrilateral structure and which represents the approximated result of a perspective projection of a square picture element onto a curved surface.

In the flow chart represented in FIG. 1, the rectangles represent the main process steps which will be explained in more detail below. The results of the process steps are stored in data structures shown schematically in the parallelograms in FIG. 1. These are used as input signals for the next process stages. The individual process steps will be described in detail below, a mathematical vector notation (represented in bold print) having been chosen for the sake of simplifying the description.

Once the data describing the footprint has been received in block 100, the vectors $v_i$ describing the vertices of the footprint are available in block 102, with i=0, 1, 2, 3 (the description of the preferred embodiment is based on the assumption of a quadrilateral footprint).

In the subsequent block 104, the footprint information provided in block 102 are used for performing a footprint analysis. On the one hand, this footprint analysis leads to establishing a direction of rotation, d, of the footprint, which is provided in block 106 and is provided at an output in block 108. In addition, the footprint analysis in block 104 yields the thickness parameter t provided in block 110. Based on the thickness parameter t provided in block 110, and based on an external performance parameter P provided in block 112, a clamp size $c_0$ is calculated, which is provided in block 116. The performance parameter P specifies the number of texels touched and/or overlapped by the footprint.

The mipmap level required is calculated in block 120. On the one hand, the calculation in block 120 receives, as external parameters, an indication of the maximum mipmap level $M_{max}$ from block 122. In addition and on the basis of the footprint data provided in block 102, a bounding box is calculated in block 124, the dimensions $b_{min}$, $b_{max}$ of which are provided in block 126 and are provided in block 120 for calculating the mipmap level. The mipmap level m calculated in block 120 is then provided in block 128 and is output in block 130.

Figure 1B:
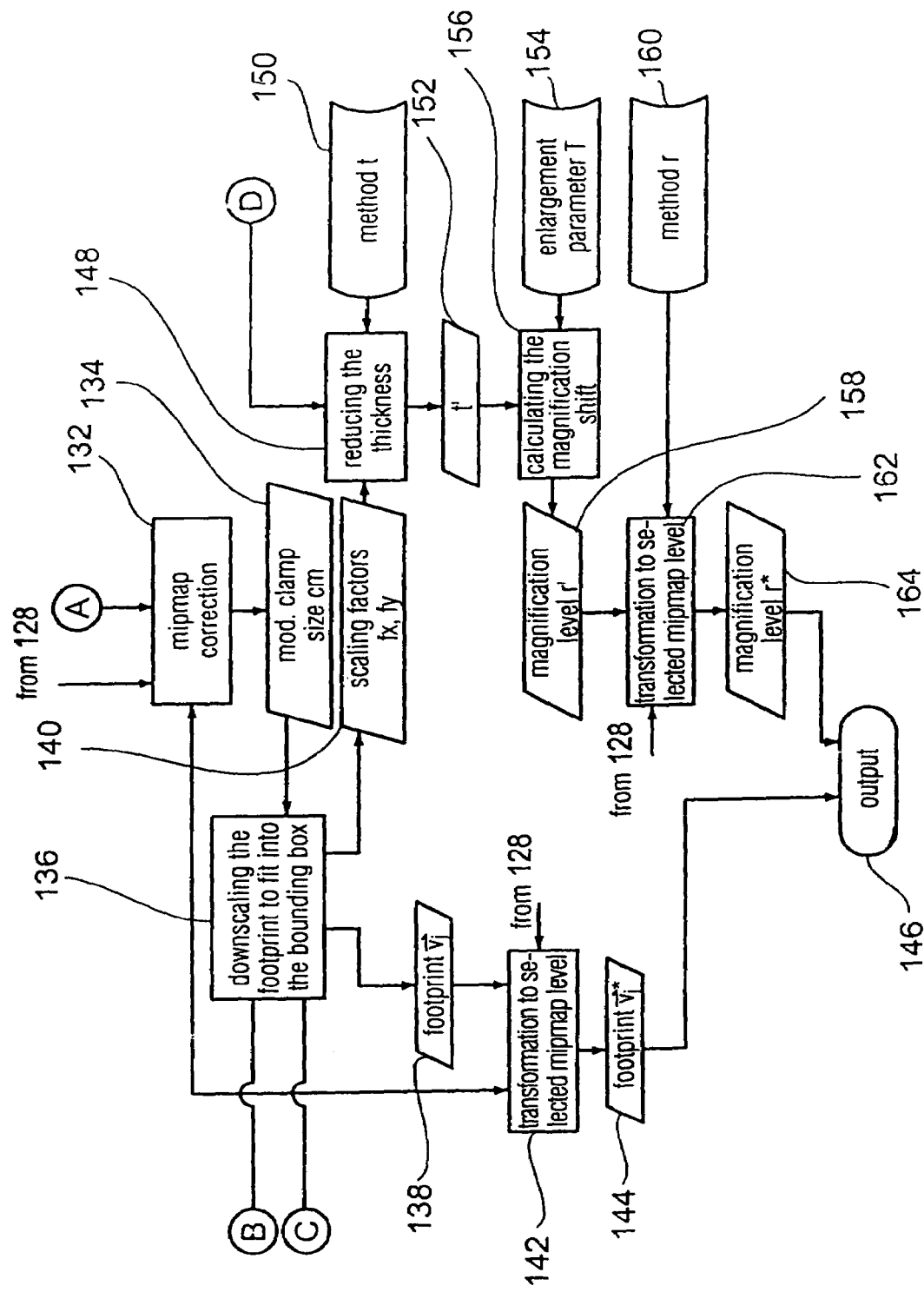

On the basis of the clamp size $c_0$ provided in block 116 and of the mipmap level m provided in block 128, a mipmap correction is performed in block 132 (see item A and FIG. 1 B). The mipmap correction leads to a modified clamp size $c_m$ provided in block 134. The modified clamp size $c_m$ is provided to block 136, wherein the footprint is scaled down such that it fits into the clamping rectangle defined by the clamp size $c_m$. The calculation performed in block S136 results, on the one hand, in modified footprint data $v'_i$ and scaling factors $f_x$, $f_y$ to be provided in blocks 138 and 140. As may also be seen in FIG. 1b, the processing stage 136 receives, in addition to the modified clamp size $c_m$, the footprint data provided in block 102 (see item B) as well as the data concerning the bounding box $b_{min}$, $b_{max}$ calculated in block 124 (see item C).

The modified footprint data $v'_i$ provided in block 138 and the mipmap level m are provided to block 142 wherein, on the basis of the data received and of information received by block 132, a transformation to a selected mipmap level is performed, so that the transformed/converted footprint data $v^*_i$ are provided in block 144, which data will be output in block 146.

In addition, the thickness is reduced in block 148 on the basis of the scaling factors $f_x$, $f_y$ provided in block 140, block 148 receiving the thickness parameter provided in block 110 (see item D) in addition to the input from block 140. In addition, block 148 receives, from block 150, a suitable algorithm for reducing the thickness t. The modified thickness parameter t' is then output in block 152. On the basis of an magnification parameter provided in block 154 and of the modified thickness parameter t' provided in block 152, the enlargement shift, or magnification shift, is calculated in block 156, so that an magnification level r' is provided in block 158. On the basis of an algorithm provided in block 160 and on the basis of the enlargement step provided by block 158, and on the basis of the mipmap level m, a transformation to the mipmap level selected is performed in block 162, so that a modified enlargement step r* is yielded in section 164, which is also output in block 146.

The individual blocks of FIG. 1 will be explained in more detail below.

Figure 2:
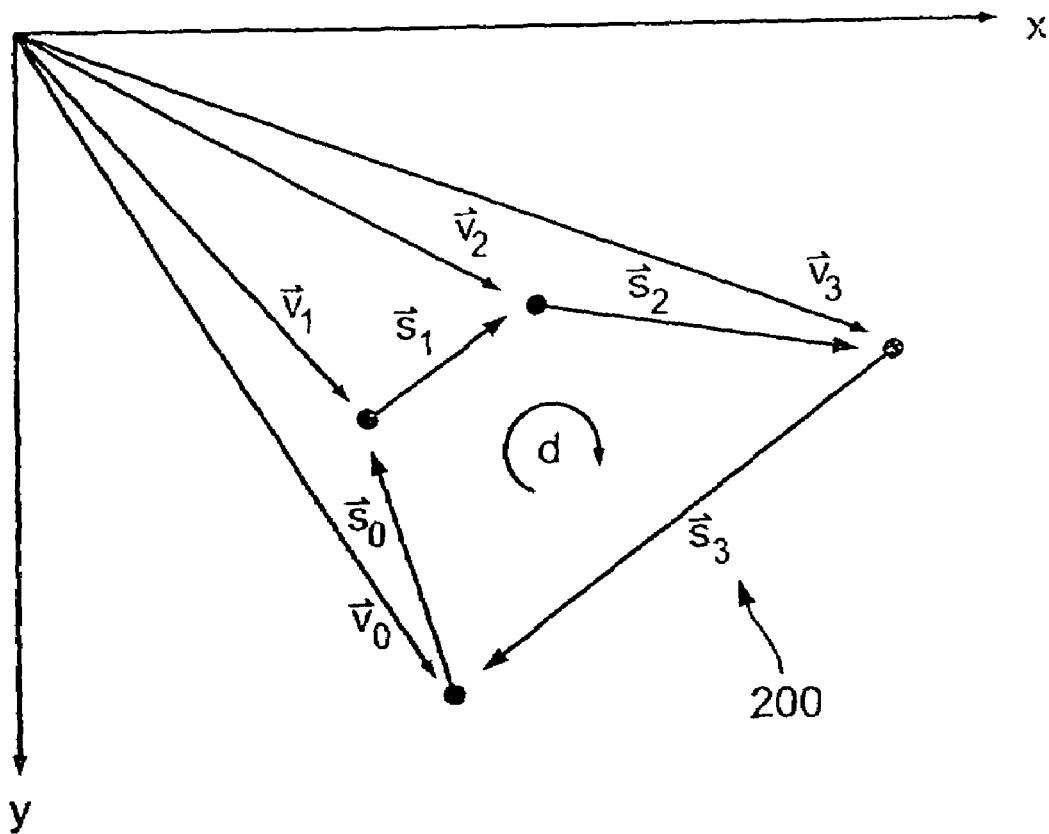
FIG. 2 is a representation of the vertices and edge vectors of an exemplary footprint in a texture space.

FIG. 2 shows an example of a convex footprint 200 arranged in a texture space spanned by the x axis and the y axis. This texture space also has arranged therein the texel grid comprising a plurality of square texel elements, some of which are overlapped by the footprint. FIG. 2 shows the vertex vectors $v_0$ to $v_3$ as well as the edge vectors $s_0$ to $s_3$. The vertex vectors $v_0$ to $v_3$ are provided as input data for the inventive method.

Figure 3:
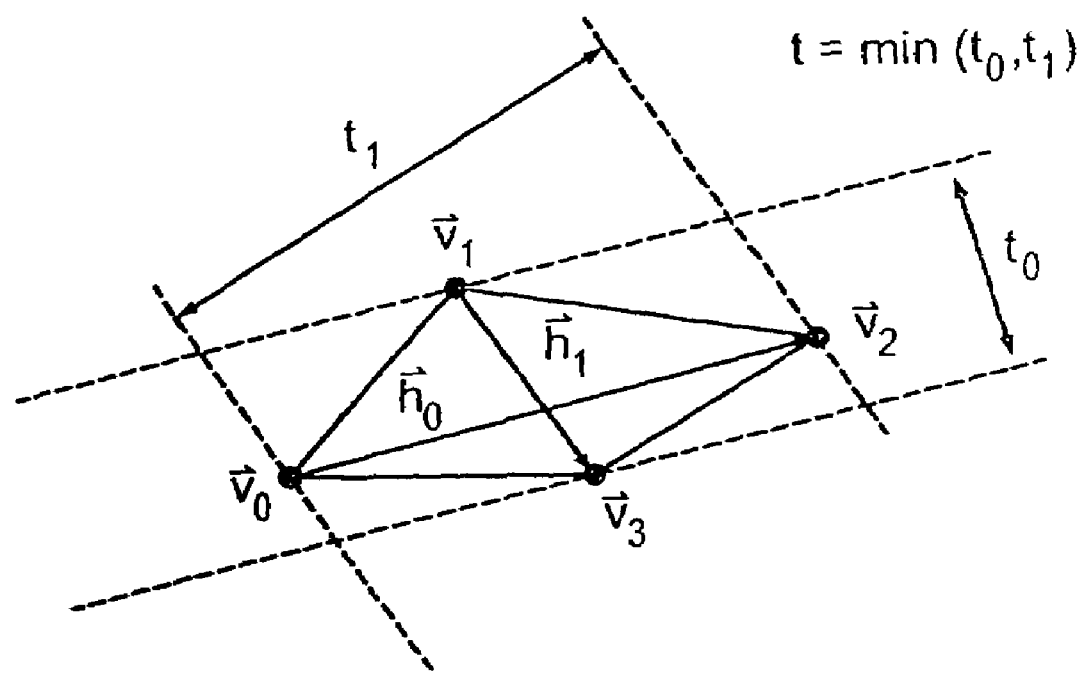
FIG. 3 is a representation of the footprint and of the thickness parameter associated with the footprint.

An important parameter used for specifying an appropriate detail level for representing the footprint is the so-called "thickness" t of the footprint. In FIG. 3 this thickness parameter is represented in more detail, for a quadrilateral footprint. In FIG. 3, the four vertex vectors $v_0$ to $v_3$ are shown as well as the two height vectors $h_0$ and $h_1$ which join the opposite vertices $v_0$ and $v_2$, and $v_1$ and $v_3$, respectively. In addition, FIG. 3 depicts two thickness parameters $t_0$ and $t_1$, the final thickness parameter t being determined by the minimal one of the two thickness parameters $t_0$ and $t_1$ shown.

As can be seen, the thickness parameter $t_0$ defines the distance between two straight lines which extend through the vertices $v_1$ and $v_3$ and are, in addition, parallel to the height vector $h_0$. Also, the thickness vector $t_1$ indicates a distance between two straight lines which extend through the vertices $v_0$ and $v_2$ and are parallel to the height vector $h_1$.

On the basis of the parameters represented in FIG. 3, the calculation of the thickness parameter t is performed in accordance with the below calculation specification.

$$\vec{h}_j = \vec{v}_{j+2} - \vec{v}_j \quad j = 0, 1$$

$$h_j = |\vec{h}_j| = \sqrt{h_{j,x}^2 + h_{j,y}^2}$$

$$\vec{h} = \vec{h}_0 \times \vec{h}_1$$

$$h_z = h_{0,x} \cdot h_{1,y} - h_{0,y} \cdot h_{1,x}$$

$$F = |\vec{h}_0 \times \vec{h}_1| = |h_z| = t_j \cdot h_j$$

$$t_j = \begin{cases} 0 & \text{if } h_j = 0 \\ F/h_j & \text{else} \end{cases}$$

$$t = \min(t_0, t_1) = \begin{cases} 0 & \text{if } h_0 = h_1 = 0 \\ F/\max(h_0, h_1) & \text{else} \end{cases}$$

In accordance with a preferred embodiment of the present invention, a direction of rotation, d, of the vertex indices may optionally also be calculated, which direction of rotation my be used in a subsequent calculation of specific edge attributes. In addition, the surface area A of the footprint may be calculated. The direction of rotation d and the area A are calculated in accordance with the below calculation specification:

$$d = \text{sign}(h_z)$$

$$A = F/2$$

wherein:

F=area of the parallelogram spanned by $h_0$ and $h_1$.

The direction d has a value of +1 for a clockwise rotation, and a value of −1 for a counterclockwise rotation. In the event that $h_0$=0 OR $h_1$=0, the footprint degenerates to a point or line, and in this case the direction of rotation, d, is 0.

After the determination of the thickness parameter t, and after the optional determination of the direction of rotation, d, and of the area A, a clamp size c is then calculated. The clamp size c is a linear function across the course of the thickness parameter t, the course being located between the settable performance parameter P and the maximum length, defined by parameter $E_{max}$, for a resulting edge. The clamp size c has a value P if t=P, a maximum area $A^*$ of the resulting footprint being set for this setting, wherein: $A^* \cong P^2$. On the basis of the setting of parameter c, a determination of an initial clamp size $c_0$ is performed in accordance with the below calculation specification.

$$0 < P < c < E_{max}$$

$$c = \left(1 - \frac{E_{max}}{P}\right) \cdot t + E_{max}$$

$$c_0 = \max(P, c)$$

Figure 4:
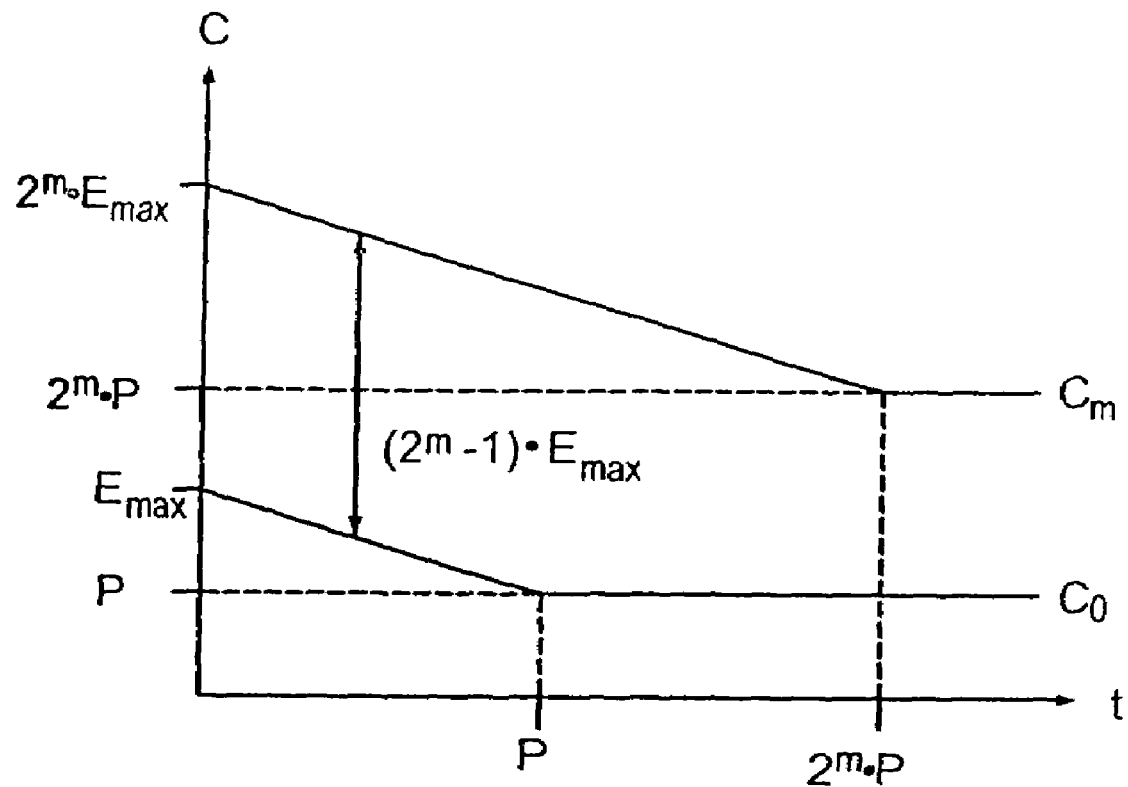
FIG. 4 depicts the course of the clamp size depending on a thickness of the footprint.

The course of the clamp size c versus the thickness parameter t is plotted in FIG. 4, and as can be seen, the value of the clamp parameter is $c = E_{max}$ for t=0 and decreases, starting from this value, in a linear fashion down to the value P, which is reached at t=P. As of this value, the value of the clamp parameter c remains constant at value P. FIG. 4 shows, in the bottommost curve, the initial bounding value and/or the initial clamp size $c_0$ and/or its course versus the thickness parameter t. In FIG. 4, the bottommost curve describes the initially calculated size of the clamp box $c_0$ for mipmap level 0. This represents a measure of the resolution to be used. The curve qualitatively describes the following behavior: with a smaller t, i.e. a narrower footprint which has thus a smaller area, the clamp size and thus the preferred resolution of the texture increases, and the texel size of same decreases in proportion to the size of the footprint. The clamping in the upward direction effected by $E_{max}$ guarantees the maximum admissible edge length, the clamping in the downward direction effected by P limits the process duration. The larger the value of P, the later a jump is performed to a lower resolution, at an increase in the area of the footprint. The upper curve $c_m$ corresponds to the coordinate transform $c_0$ for a mipmap level m. The latter is required if m does not equal $m_{req}$, and downscaling is thus required.

The calculation of the necessary mipmap level $m_{req}$ and of the required downscaling of the size of the footprint will be explained in more detail below with reference to FIG. 5.

Initially it shall be assumed that for the footprint which is to be represented, a mipmap level exists in the footprint's original dimension and shape, which mipmap level avoids downscaling of the footprint. By means of this minimum mipmap level it is ensured that no side of a bounding box for the footprint is larger than the clamp size $c_0$ determined in the above-described manner. In addition to footprint 200, FIG. 5 also shows, in an exemplary manner, a bounding box 202, and the bounding box 202 as well as the required mipmap level $m_{req}$ is produced in accordance with the below calculation specifications:

$$\vec{b}_{min} = \begin{pmatrix} \min(v_{0,x}, v_{1,x}, v_{2,x}, v_{3,x}) \\ \min(v_{0,y}, v_{1,y}, v_{2,y}, v_{3,y}) \end{pmatrix}$$

$$\vec{b}_{max} = \begin{pmatrix} \max(v_{0,x}, v_{1,x}, v_{2,x}, v_{3,x}) \\ \max(v_{0,y}, v_{1,y}, v_{2,y}, v_{3,y}) \end{pmatrix}$$

$$\vec{b} = \vec{b}_{max} - \vec{b}_{min}$$

$$m_{reg} = \max\left(0, \text{ceil}\left(\log_2\left(\frac{\max(b_x, b_y)}{c_0}\right)\right)\right)$$

wherein the function of "ceil" signifies that the term in brackets is increased to the next integer value in the direction +∞. FIG. 5 represents the parameters $b_{min}$ and b reproduced in the above calculation specification, and the parameter $b_{max}$, which is also reproduced in the calculation specification, is the vector which extents from the origin of the coordinate system to the peak of vector b, but which is not represented for the sake of clarity.

In order to obtain the mipmap level m to be applied, the mipmap level required is clamped to the highest available level value $M_{max}$ in accordance with the following calculation specification:

$$m = \min(M_{max}, m_{req})$$

If it is found, however, that the desired mipmap level m is smaller than that mipmap level specified by the bounding box, i.e. is smaller than $m_{req}$, it is necessary to reduce the size of the footprint such that same fits into a clamping box. The clamping box is calculated on the basis of a mipmap-corrected clamp size $c_m$, which is determined in accordance with the below calculation specification:

$$c_m = \max(P \cdot 2^m, c + (2^m - 1) \cdot E_{max})$$

The course of the parameter of the corrected clamp size $c_m$ is also plotted in FIG. 4.

Figure 5:
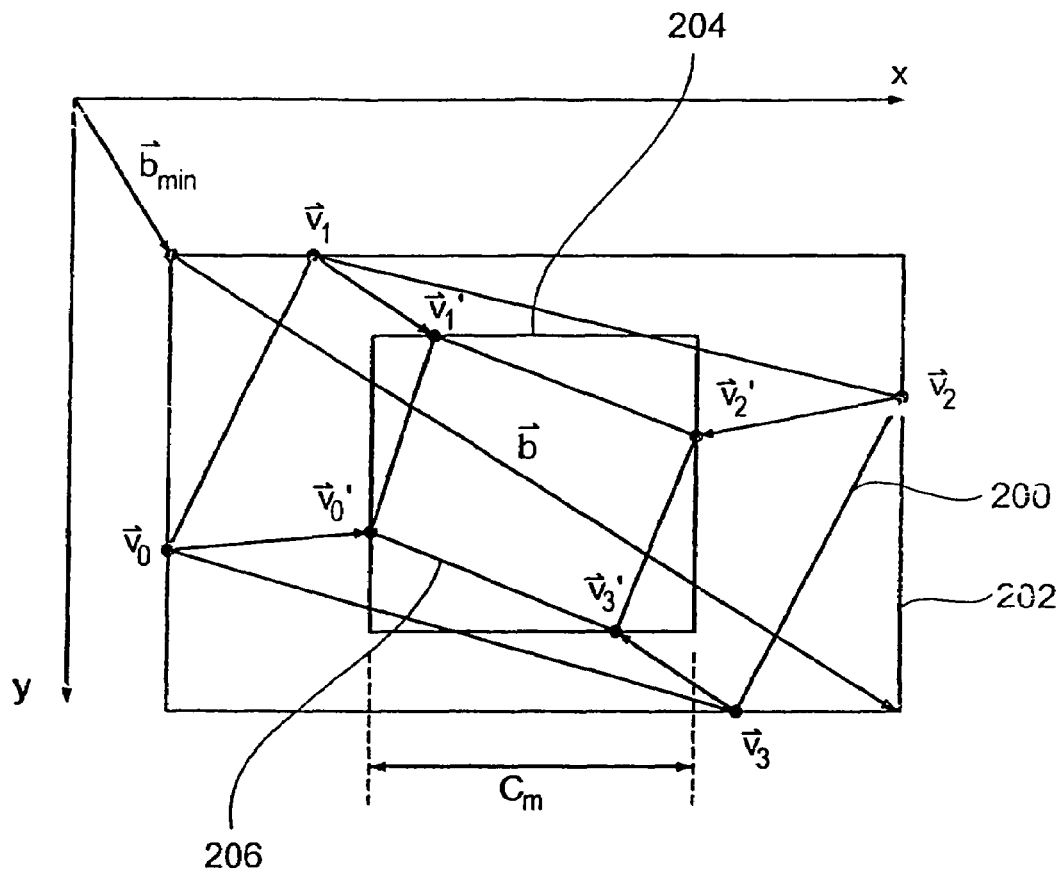
FIG. 5 shows an example of the scaling-down of the footprint.

FIG. 5 shows the clamping box 204 created on the basis of the corrected clamp size $c_m$. The reduction of the size of the footprint 200 to the downscaled footprint 206 is effected such that the vertices $v_0$ to $v_3$ of the original footprint are converted to the vertices $v_0'$ to $v_3'$ in such a manner that the converted vertices are arranged on the edges of the clamping box 104. The conversion of the original vertices to the modified vertices is effected in accordance with the below calculation specification:

$$f_{x,y} = \min\left(1, \frac{b_{x,y}}{c_m}\right)$$

$$\vec{v}_i = \begin{pmatrix} f_x & 0 \\ 0 & f_y \end{pmatrix} \cdot (\vec{v}_i - \vec{b}_{\min}) + \vec{b}_{\min} + \frac{1}{2}\left(\vec{b} - \begin{pmatrix} c_m \\ c_m \end{pmatrix}\right)$$

wherein:
$f_x$, $f_y$=scaling factors for the x and y directions.

In a final block, the coordinates of the reduced footprint $v'_i$ must be transferred to the mipmap level m, which is performed in accordance with the below calculation specification:

$$\vec{v}*_i = 2^{-m} \cdot \vec{v}'_i$$

In addition, the inventive method may make provisions for providing an magnification level in dependence on the thickness parameter t which may be used later on for enlarging footprints with a sub-texel size so as to avoid temporal and spatial artifacts in the representation of a footprint which includes a plurality of footprints.

Once the thickness parameter t has also been changed due to the reduction of the size of the footprint, the former must also be set. Since the thickness parameter t is an anisotropic property, same may be calculated by creating a new thickness parameter for the downscaled vertex vectors on the basis of the above calculation specification, which involves a large amount of calculation expenditure, however. In accordance with a preferred embodiment, the thickness parameter t is determined approximately, however, at much less expense by using the oriented scaling factors $f_x$ and $f_y$ (method t), so that the following methods are available for determining the set thickness parameter t':

(1) $t' = t(\vec{v}'_i)$ (2) $t' = t \cdot \dfrac{f_x + f_y}{2}$ (3) $t' = t \cdot \min(f_x, f_y)$ The method described with (2) is preferred, as has been explained above.

The magnification level r is controlled by a settable magnification parameter T describing a minimum thickness without magnification. The magnification level is created in accordance with the following calculation specification:

$$r' = \max\left(0, \frac{T - t'}{2}\right)$$

The higher the value of T, the more blurring is introduced into the image to be represented, but, at the same time, fewer artifacts are noticed. A value of $\sqrt{2}$ for T has proven to be advantageous. If T=0 is chosen, any magnification is deactivated.

Similar to the above determination of the altered thickness parameter t' there are three possible ways (method r) for converting the delay level r' to the selected mipmap level m; specifically:

1) $r^* = r' \cdot 2^{-m}$

2) $r^* = r'$

3) $r^* = r' + \left(\dfrac{1}{2} - 2^{-(m+1)}\right) \cdot t'$

The method referred to as 1) maintains the effective filter size for all mipmap levels. The compensation of elements having a size smaller than a texel, however, applies only to mipmap level 0 and becomes less and less effective, the higher the mipmap level becomes. Method 3) ensures the consistency of T with all levels. The effective filter size, however, undergoes discrete enlargement between two levels and, in addition, the calculation is more expensive. The preferred method 2), eventually, is a compromise between 1) and 3) and is thus the method which is easiest to implement, of course.

With the parameters described in the above manner, a color of the footprint may be calculated in subsequent process steps. To this end, the determined parameters of a further process stage of the graphics unit are provided, which graphics unit then creates a color of the footprint in a conventional manner.

Even though the present invention has been described on the basis of a footprint having four sides in the above description of the preferred embodiments, the inventive approach may in principle be extended to any footprints.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method of modifying a footprint in dependence on a specified number of texture elements touched by the footprint, in a graphics system providing the texture elements having a resolution, comprising:
  (a) determining a dimension or a shape of the footprint;
  (b) specifying the resolution of the texture elements associated with the footprint, based on the specified number of texture elements and based on the dimension or shape determined in step (a); and
  (c) determining whether the graphics system provides texture elements having the resolution specified in step (b),
    (c.1) if the graphics system provides texture elements having the resolution specified in step (b), maintaining the footprint; and
    (c.2) if the graphics system does not provide texture elements having the resolution specified in step (b), selecting the texture elements provided by the graphics system and having a respective resolution, and reducing the size of the footprint such that the number of texture elements touched by the footprint having the reduced size is essentially equal to or smaller than the specified number.

2. The method as claimed in claim 1, wherein the graphics system provides the texture elements having a plurality of resolutions, texture elements having a resolution which is one down from the specified resolution being selected in step (c.2).

3. The method as claimed in claim 1, wherein step (a) comprises:
   (a.1) determining whether an edge of the footprint exceeds a specified dimension; and
   (a.2) reducing the size of the footprint until the dimension of the edge is smaller than or equal to the specified dimension, if the dimension of the edge exceeds the specified dimension.

4. The method as claimed in claim 1, wherein the graphics system provides the texture elements having different resolutions in the form of mipmaps of various levels.

5. The method as claimed in claim 1, wherein step (b) includes specifying a rectangle surrounding the footprint, vertices of the footprint being arranged on edges of the rectangle.

6. The method as claimed in claim 5, wherein the rectangle and the bounding box are specified based on a thickness parameter of the footprint.

7. The method as claimed in claim 1, wherein step (c.2) comprises:
   specifying a bounding box in dependence on the resolution of the texture element provided by the graphics system, and
   reducing the size of the footprint by shifting the vertices of the footprint onto edges of the bounding box.

* * * * *